US008730875B2

(12) United States Patent
Noda

(10) Patent No.: US 8,730,875 B2
(45) Date of Patent: May 20, 2014

(54) WIRELESS COMMUNICATION TERMINAL, WIRELESS COMMUNICATION FORWARDING CONTROL SYSTEM, WIRELESS COMMUNICATION FORWARDING CONTROL METHOD, AND WIRELESS COMMUNICATION FORWARDING CONTROL PROGRAM

(75) Inventor: Jun Noda, Minato-ku (JP)

(73) Assignee: NEC Corporation, Tokyo (JP)

( * ) Notice: Subject to any disclaimer, the term of this patent is extended or adjusted under 35 U.S.C. 154(b) by 231 days.

(21) Appl. No.: 13/321,030

(22) PCT Filed: May 10, 2010

(86) PCT No.: PCT/JP2010/003174
§ 371 (c)(1),
(2), (4) Date: Nov. 17, 2011

(87) PCT Pub. No.: WO2010/134281
PCT Pub. Date: Nov. 25, 2010

(65) Prior Publication Data
US 2012/0069738 A1   Mar. 22, 2012

(30) Foreign Application Priority Data

May 18, 2009  (JP) ................................. 2009-119934

(51) Int. Cl.
*H04L 12/54*  (2013.01)
(52) U.S. Cl.
USPC .......................................... 370/328; 370/392
(58) Field of Classification Search
USPC .................. 370/232, 252, 328, 389, 392, 428
See application file for complete search history.

(56) References Cited

U.S. PATENT DOCUMENTS

| 7,116,672 | B1 * | 10/2006 | Sivakumar ................. 370/395.4 |
| 7,298,707 | B2 * | 11/2007 | Retana et al. ................. 370/252 |
| 7,369,512 | B1 * | 5/2008 | Shurbanov et al. ........... 370/254 |
| 7,593,376 | B2 * | 9/2009 | D'Amico et al. ............. 370/338 |
| 2003/0163554 | A1 * | 8/2003 | Sendrowicz ................. 709/220 |

(Continued)

FOREIGN PATENT DOCUMENTS

| JP | 08-097821 A | 4/1996 |
| JP | 2008-047984 A | 2/2008 |
| WO | 2007/082244 A2 | 7/2007 |

OTHER PUBLICATIONS

Takashi Suou, et al., Adaptive Flooding Control Method for Route Stabilization and Redundant Packet Reduction in MANET', The Transactions of the Institute of Electronics, Information and Communication Engineers, Dec. 1, 2007, pp. 1330-1336, vol. J90-B, No. 12.

(Continued)

*Primary Examiner* — Brian D Nguyen
(74) *Attorney, Agent, or Firm* — Sughrue Mion, PLLC

(57) ABSTRACT

There is provided a wireless communication terminal that autonomously determines whether the wireless communication terminal is in a state in which flooding should be performed or a state in which the flooding should not be performed in a wireless ad-hoc network. At each predetermined time, the wireless communication terminal that performs the flooding autonomously infers whether the wireless communication terminal is in a state in which the flooding should be performed or a state in which the flooding should not be performed from the number of flooding packets that are of a packet flooded from surrounding wireless communication terminals based on a hidden Markov model.

16 Claims, 9 Drawing Sheets

(56) References Cited

U.S. PATENT DOCUMENTS

| | | | |
|---|---|---|---|
| 2006/0013154 A1* | 1/2006 | Choi et al. | 370/312 |
| 2007/0076633 A1* | 4/2007 | Sin | 370/254 |
| 2007/0087756 A1* | 4/2007 | Hoffberg | 455/450 |
| 2007/0230372 A1* | 10/2007 | He et al. | 370/260 |
| 2008/0043635 A1* | 2/2008 | Retana et al. | 370/252 |

OTHER PUBLICATIONS

Takashi, Suou, et al. "Adaptive Flooding Control Method for Route Stabilization and Redundant Packet Reduction in MANET", The Transactions of Institute of Electronics, Information and Communication Engineers, Dec. 1, 2007, pp. 1330-1336, vol. J90-B, No. 12.

* cited by examiner

FIG. 2

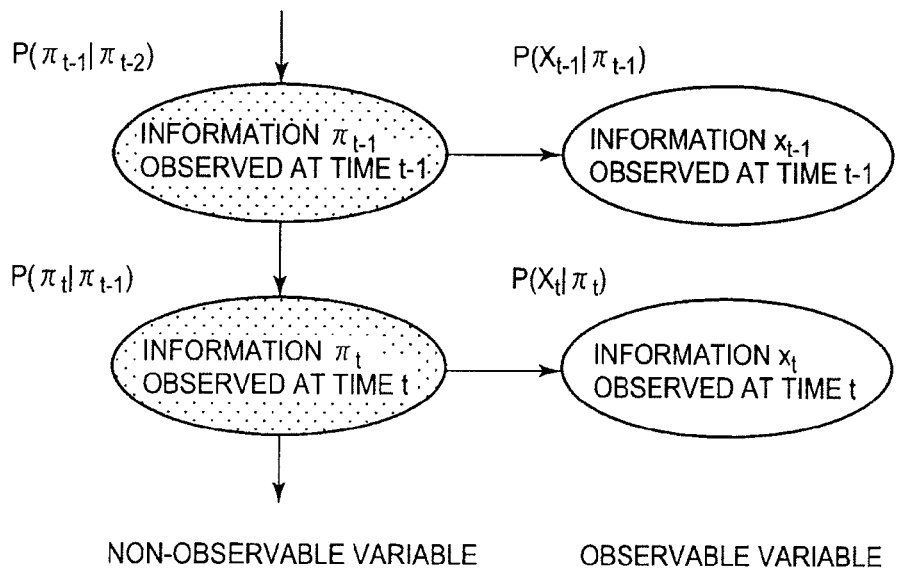

NON-OBSERVABLE VARIABLE     OBSERVABLE VARIABLE

FIG. 3

- S : FINITE SET OF STATES
- T : FINITE SET OF OUTPUT SYMBOLS
- $\delta : S \times S \to R$  $\delta(s,s')$ IS TRANSITION PROBABILITY FROM STATE s TO STATE s'

$\Sigma_{s' \in S} \delta(s,s') = 1$ FOR EACH s

- $\psi : S \times T \to R$  $\psi(s, \alpha)$ IS PROBABILITY THAT SYMBOL $\alpha$ IS OUTPUT IN STATE s $\Sigma_{\alpha \in T} \psi(s, \alpha) = 1$ FOR EACH s

- $I : S \to R$  $I(s)$ IS EXISTENCE PROBABILITY IN STATE s AT THE BEGINNING OF PERFORMANCE, $\Sigma_{s \in S} I(s) = 1$

\* R INDICATES SET OF REAL NUMBERS

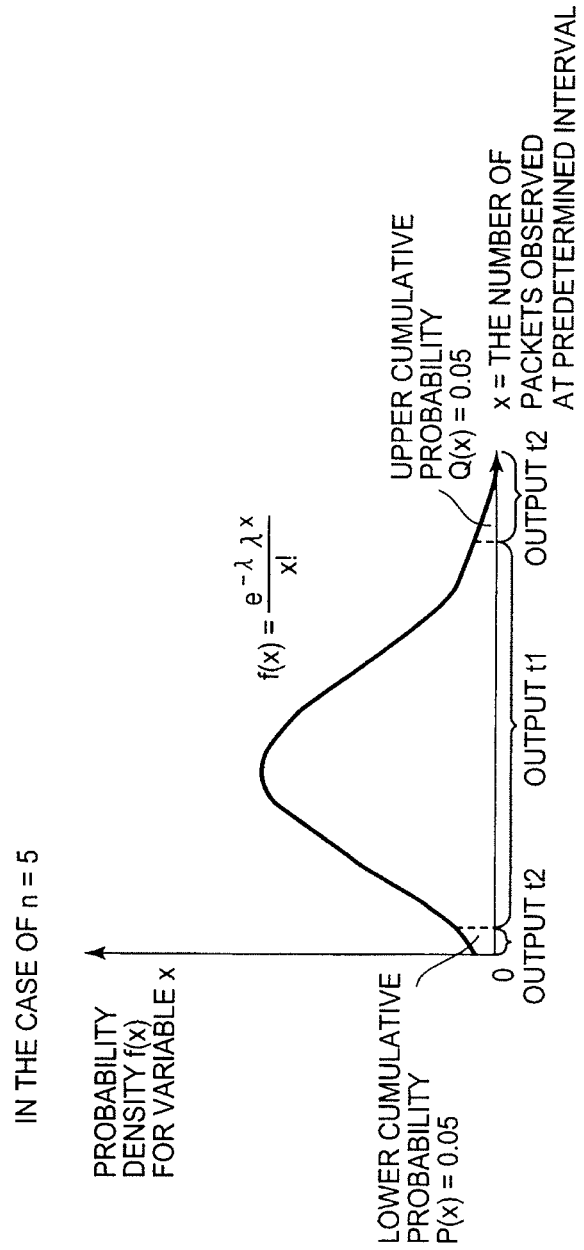

FIG. 5

- $S = \{s1, s2\}$    s1: NORMAL, s2: WAITING

- $T = \{t1, t2\}$    t1: SYMBOL OUTPUT WHEN BOTH UPPER CUMULATIVE PROBABILITY Q(x) AND LOWER CUMULATIVE PROBABILITY P(x) are n% (FOR EXAMPLE, n = 5) OR MORE
  t2: SYMBOL OUTPUT IN OTHER CASES

- $\delta 11=0.8, \delta 12=0.2,$
  $\delta 21=0.1, \delta 22=0.9$    $\delta ij$ IS STATE TRANSITION PROBABILITY FROM STATE si TO STATE sj
- $\phi 1(t1)=0.8, \phi 1(t2)=0.2,$
  $\phi 2(t1)=0.4, \phi 2(t2)=0.6$    $\phi i(j)$ IS PROBABILITY THAT OUTPUT SYMBOL j IS OBSERVED in STATE Si
- $I1=1.0, I2=0.0$

FIG. 6

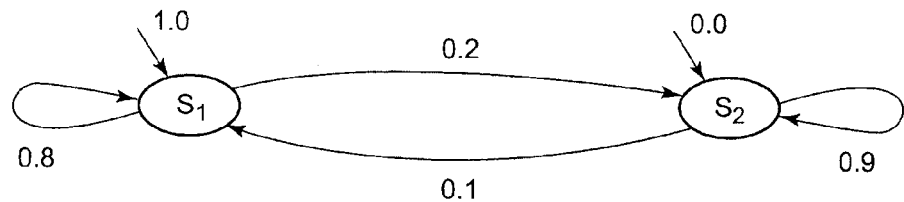

FIG. 7

$$f_i(t) = P(x_1 \cdots x_t, \pi_t = s_i)$$

$$= P(x_t \mid \pi_t = s_i) \sum_{k=1}^{n} P(x_1 \cdots x_{t-1}, \pi_{t-1} = s_k) P(\pi_t = s_i \mid \pi_{t-1} = s_k)$$

$$= \psi_i(x_t) \sum_{k=1}^{n} f_k(t-1) \delta_{ki} \qquad (1 \leq t),$$

$$f_i(0) = I_i$$

$$p_i(t) = f_i(t) / P(x_1 \cdots x_t) = f_i(t) / \left( \sum_{k=1}^{n} f_k(t) \right)$$

FIG. 8

| t | 0 | 1 | 2 | 3 | 4 | 5 |
|---|---|---|---|---|---|---|
| $x_t$ |  | t1 | t2 | t2 | t2 | t1 |
| $f_1(t)$ | 1 | 0.64 | 0.104 | 0.019 | 0.005 | 0.006 |
| $f_2(t)$ | 0 | 0.08 | 0.12 | 0.077 | 0.044 | 0.016 |
| $p_1(t)$ | 1 | 0.889 | 0.464 | 0.198 | 0.094 | 0.285 |
| $p_2(t)$ | 0 | 0.111 | 0.536 | 0.802 | 0.906 | 0.715 |

WIRELESS COMMUNICATION TERMINAL, WIRELESS COMMUNICATION FORWARDING CONTROL SYSTEM, WIRELESS COMMUNICATION FORWARDING CONTROL METHOD, AND WIRELESS COMMUNICATION FORWARDING CONTROL PROGRAM

CROSS REFERENCE TO RELATED APPLICATIONS

This application is a National Stage of International Application No. PCT/JP2010/003174 filed May 10, 2010, claiming priority based on Japanese Patent Application No. 2009-119934 filed May 18, 2009, the contents of all of which are incorporated herein by reference in their entirety.

TECHNICAL FIELD

The present invention relates to a wireless communication terminal, a wireless communication forwarding control system, a wireless communication forwarding control method, and a wireless communication forwarding control program, which perform effective flooding to distribute a packet to a whole of network in a network including only wireless communication terminals that have wireless communication functions of being able to establish connection P2P (Peer to Peer) without an access point unlike a wireless LAN, namely, a wireless ad-hoc network. The wireless communication terminal constituting the wireless ad-hoc network includes a personal computer, a PDA (Personal Digital Assistant), and a mobile phone (hereinafter referred to as a wireless terminal). Even in an information processing terminal device such as the personal computer, the information processing terminal device is included in the wireless terminal when the information processing terminal device has the wireless communication function.

BACKGROUND ART

The flooding is used in a route search protocol and the like, and is a basic element technology in the wireless ad-hoc network. In the flooding, the packet is broadcasted to all nodes existing in a communication range. Patent Literature 1 describes an example of a flooding method. FIG. 12 is an explanatory view illustrating an example of a configuration of the wireless data communication system described in Patent Literature 1. In the wireless data communication system illustrated in FIG. 12, on the assumption that the wireless terminals are disposed such that communication ranges (corresponding to a zone A to a zone E illustrated in FIG. 12) of the wireless terminals overlap each other, the broadcast is repeatedly performed to all the nodes existing in the communication ranges, whereby the packet is relayed and transmitted in sequence. Patent Literature 1 describes the method for distributing the packet to the plural wireless terminals. At this point, the wireless terminal that receives the packet recognizes that the packet is the packet addressed thereto when a destination address described in the packet is matched with own address of the wireless terminal.

CITATION LIST

Patent Literature

Patent Literature 1: Japanese Patent Application Laid-Open No. 8-97821 (Paragraphs 0011 to 0020)

DISCLOSURE OF THE INVENTION

Problems to be Solved by the Invention

However, in the wireless data communication system described in Patent Literature 1, when the movable wireless terminals move and densely packed (the overlap of the communication ranges becomes dense), a packet-to-packet collision is frequently generated to degrade communication efficiency. When the overlap of the communication ranges is eliminated, the broadcast that is unreached to any wireless terminal is generated and power efficiency is degraded by the useless communication. That is, at each time the flooding is performed, the wireless data communication system described in Patent Literature 1 cannot perform the control based on whether the wireless terminal is in the state in which the flooding should be performed.

In view of the foregoing, an object of the invention is to provide a wireless communication terminal, a wireless communication forwarding control system, a wireless communication forwarding control method, and a wireless communication forwarding control program, which autonomously determines whether each wireless communication terminal is in the state in which the wireless communication terminal should perform the flooding in the wireless ad-hoc network.

Solutions to the Problems

According to the present invention, a wireless communication terminal that performs flooding is characterized in that whether the wireless communication terminal is in a state in which the flooding should be performed or a state in which the flooding should not be performed is autonomously inferred, at each predetermined time, from the number of flooding packets that are of a packet flooded from surrounding wireless communication terminals based on a hidden Markov model.

According to the present invention, a wireless communication forwarding control system in which plural wireless communication terminals each of which performs flooding conduct wireless communication is characterized in that whether the wireless communication terminal is in a state in which the flooding should be performed or a state in which the flooding should not be performed is autonomously inferred, at each predetermined time, from the number of flooding packets that are of a packet flooded from surrounding wireless communication terminals based on a hidden Markov model.

According to the present invention, a wireless communication forwarding control method comprising: inferring autonomously, at each predetermined time, whether the wireless communication terminal is in a state in which the flooding should be performed or a state in which the flooding should not be performed from the number of flooding packets that are of a packet flooded from surrounding wireless communication terminals based on a hidden Markov model.

According to the present invention, a wireless communication forwarding control program is characterized in that a computer, which is mounted on a wireless communication terminal that performs flooding, is caused to perform processing of autonomously inferring whether the wireless communication terminal is in a state in which the flooding should be performed or a state in which the flooding should not be performed, at each predetermined time, from the number of flooding packets that are of a packet flooded from surrounding wireless communication terminals based on a hidden Markov model.

Effects of the Invention

According to the invention, whether each wireless communication terminal is in the state in which the wireless communication terminal should perform the flooding can autonomously be determined in the wireless ad-hoc network, and the degradation of the communication efficiency and the power efficiency can be suppressed in the whole of network.

BRIEF DESCRIPTION OF THE DRAWINGS

FIG. 2 is an explanatory view illustrating a probability model that is used in state probability computing means of the wireless communication forwarding control system illustrated in FIG. 1.

FIG. 3 is an explanatory view illustrating a formal structure of a hidden Markov model.

FIG. 4 is an explanatory view illustrating an output symbol set.

FIG. 5 is an explanatory view illustrating a design example by the formal structure of the hidden Markov model illustrated in FIG. 3.

FIG. 6 is an explanatory view illustrating examples of a state transition probability δ and an initial existence probability I, which are illustrated in FIG. 5.

FIG. 7 is an explanatory view illustrating an example of an algorithm used to compute Pi(t).

FIG. 8 is an explanatory view illustrating a computation result at each time.

DESCRIPTION OF EMBODIMENTS

First Exemplary Embodiment

Figure 1:
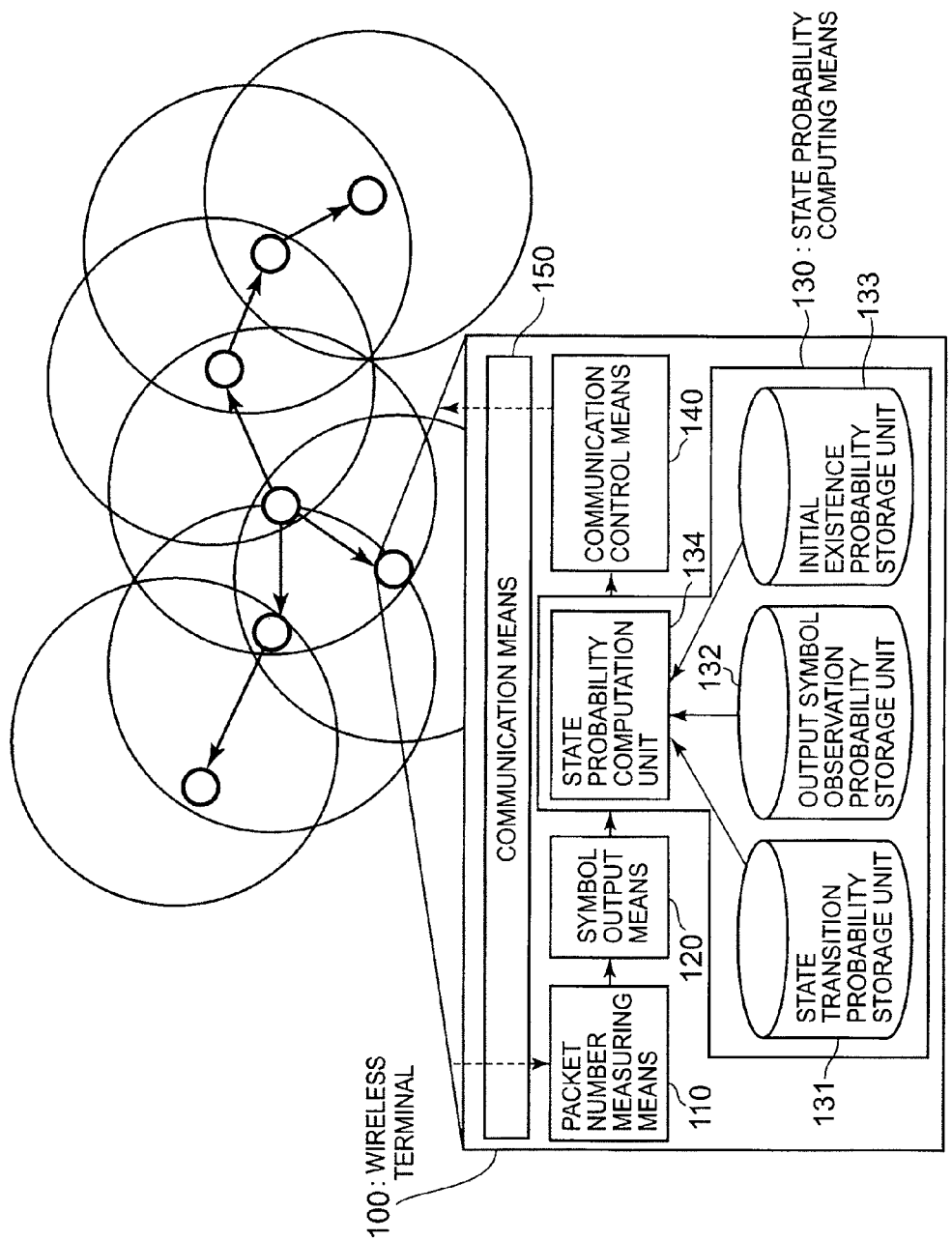
FIG. 1 is a block diagram illustrating a configuration of a wireless communication forwarding control system according to a first exemplary embodiment of the invention.

FIG. 1 is a block diagram illustrating a configuration of a wireless communication forwarding control system according to a first exemplary embodiment of the invention. The configuration of the wireless communication forwarding control system according to the first exemplary embodiment of the invention will described with reference to FIG. 1.

The wireless communication forwarding control system illustrated in FIG. 1 includes plural wireless terminals each of which is operated by program control. A wireless terminal 100 includes packet number measuring means 110, symbol output means 120, state probability computing means 130, communication control means 140, and communication means 150.

The packet number measuring means 110 always measures the number of packets (flooding packets), which are received from surrounding wireless terminals by flooding. The packet number measuring means 110 outputs the number of flooding packets since a previous time at each predetermined time to the symbol output means 120.

The symbol output means 120 stores the number of flooding packets measured by the packet number measuring means 110 in a storage unit (not illustrated). The symbol output means 120 computes an average value λ of the number of flooding packets based on a sum of the numbers of flooding packets, which are output from the packet number measuring means 110 at each predetermined time, and the number of measuring times. The average value λ of the number of flooding packets is stored in the storage unit. In a Poisson distribution adhering to the average value λ of the number of flooding packets, the symbol output means 120 generates a symbol (output symbol) corresponding to a cumulative probability with respect to the number of received packets. The symbol output means 120 stores the generated output symbol in the storage unit and outputs the output symbol, which is generated at each time interval, as a string of output symbols to the state probability computing means 130.

The string of output symbols output from the symbol output means 120 is input to the state probability computing means 130, and the state probability computing means 130 computes a posterior probability indicating a probability whether the wireless terminal 100 is in a normal state or a waiting state. The state probability computing means 130 includes a state transition probability storage unit 131, an output symbol observation probability storage unit 132, an initial existence probability storage unit 133, and a state probability computation unit 134.

The communication control means 140 controls communication such that other wireless terminals perform the flooding, when the posterior probability computed by the state probability computing means 130 shows that the probability that the wireless terminal 100 is in the normal state is higher than the probability that the wireless terminal 100 is in the waiting state.

In the wireless terminal 100, the communication means 150 conducts communication with another wireless terminal. For example, the packet number measuring means 110 measures the number of flooding packets received from another wireless terminal through the communication means 150, and the communication control means 140 performs the flooding through the communication means 150.

In the first exemplary embodiment, the state probability computing means can infer whether the wireless terminal 100 is in the state (normal state) in which the flooding should be performed or the state (waiting state) in which the flooding should not be performed. A set {normal, waiting} of the state (normal state) in which the flooding should be performed and the state (waiting state) in which the flooding should not be performed is given as a target of the inference. It is assumed that the state of the wireless terminal 100 is indicated by a random variable on the set. The state cannot be observed from the outside. However, the number of packets, which are flooded from surrounding wireless terminals, can be observed as information having a correlation with the state. The state changes with time, and the current state has correlations with states in previous times.

FIG. 2 is an explanatory view illustrating a probability model that is used in the state probability computing means of the wireless communication forwarding control system illustrated in FIG. 1. An oval illustrated in FIG. 2 indicates each random variable of an observable variable and a non-observable variable (hidden variable). An arrow illustrated in FIG. 2 indicates that a correlation exists between the random variables connected by the arrow. Magnitude of the correlation between the random variables is indicated by a conditional probability. Each conditional probability is previously given, and a real state is inferred from the observed information. An HMM (Hidden Markov Model) is introduced as the probability model in order that a value of the hidden variable that changes with time is inferred based on a value of the observable variable.

FIG. 3 is an explanatory view illustrating a formal structure of the hidden Markov model. A hidden Markov model M is indicated by a group of five terms including a state set S, an output symbol set T, a state transition probability δ, an output symbol observation probability φ, and an initial existence probability I, namely, M={S,T,δ,φ,I}.

The state set S is a state set that is the target of the inference. The state set S is indicated by S={s1: normal, s2: waiting}.

The output symbol set T is a set of output symbols that are output by the symbol output means 120 according to an appearance frequency of the number of flooding packets, which can be measured between a certain time t and a previous time (t−1), from the surrounding wireless terminals. FIG. 4 is an explanatory view illustrating the output symbol set. A curve illustrated in FIG. 4 is the Poisson distribution adhering to the average value λ of the number of flooding packets received at predetermined time intervals by each wireless terminal. After the Poisson distribution illustrated in FIG. 4 is introduced, the symbol output means 120 computes an upper cumulative probability Q(x) and a lower cumulative probability P(x) of the Poisson distribution illustrated in FIG. 4 with respect to a packet number x that is observed at a certain time. The symbol output means 120 outputs an output symbol t1 in the case that both the upper cumulative probability Q(x) and the lower cumulative probability P(x) are n % (for example, n=5 in FIG. 4) or more, and the symbol output means 120 outputs an output symbol t2 in other cases, namely, T={t1, t2}.

Thresholds n of the upper cumulative probability Q(x) and the lower cumulative probability P(x) may separately be set. In the case that the average value λ of the number of flooding packets received at predetermined time intervals is sufficiently large (generally, λ>1000), approximation may be performed using a normal distribution of a square root of the average value λ or a standard deviation λ instead of the Poisson distribution.

The current state depends only on the last state. The state transition probability δ indicates the conditional probability that the last state transitions to the current state. The state transition probability δ is stored in the state probability storage unit 131 of the state probability computing means 130.

The output symbol output by the symbol output means 120 depends on the current state. The output symbol observation probability φ indicates the conditional probability that the symbol output means 120 outputs a certain output symbol in each state. The output symbol observation probability φ is stored in the output symbol observation probability storage unit 132.

The initial existence probability I indicates an existence probability at a certain state when the state probability computing means 130 starts the computation of the posterior probability. The initial existence probability I is stored in the initial existence probability storage unit 133.

The threshold n, state transition probability δ, the output symbol observation probability φ, and the initial existence probability I are previously given. The output symbol observation probability φ is fixed on the assumption that the output symbol set T is likely to indicate t1 when the state S is s1 (normal) and the assumption that the output symbol set T is likely to indicate t2 when the state S is s2 (waiting). Each of the threshold n, the state transition probability δ and the initial existence probability I has a degree of freedom based on an operational policy of the network and is fixed according to knowledge and know-how, which are obtained in the past operation. In the case that a factor in determining the threshold or the probability does not exist, each probability may be set to a predetermined equal probability.

FIG. 5 is an explanatory view illustrating a design example by the formal structure of the hidden Markov model illustrated in FIG. 3. The state S, output symbol set T, the state transition probability δ, the output symbol observation probability φ, and the initial existence probability I, which constitute the hidden Markov model M, are fixed in FIG. 5. FIG. 6 is an explanatory view illustrating examples of the state transition probability δ and the initial existence probability I, which are illustrated in FIG. 5. FIG. 6 illustrates the normal state s1 and the waiting state s2, which transition according to the probability illustrated in FIG. 5.

In the hidden Markov model M, the input is set to an output symbol string Xt (Xt=x1, x2, . . . , xt∈T), and the posterior probability that the hidden Markov model M exists in a state si (1≤i≤2) when Xt is observed is set to pi(t) (Pi(t)=P(πt=si|Xt=x1, x2, . . . , xt)). At this point, x1, x2, . . . , xt are t1 or t2. πt is the random variable indicating the state of the hidden Markov model M at the time t. The state probability computation unit 134 computes the posterior probability Pi(t) while the output symbol string Xt is used as the input.

FIG. 7 is an explanatory view illustrating an example of an algorithm for computing Pi(t). pi(t) is computed at each time t according to the algorithm illustrated in FIG. 7. In the case that Pi(t) has a relationship of $p2(t) > p1(t)$, the communication control means 140 controls the communication such that the wireless terminal 100 waits for the flooding at least until the next time (t+1).

In the design example of the hidden Markov model M illustrated in FIG. 5, when the output symbol string Xt is given in the form of (t1, t2, t2, t2, t1), specific computation examples (1) to (3) in which the state probability computation unit 134 computes the posterior probability Pi(t) will be described below.

(1) An initial state in the case of t=0

$f1(0) = I1 = 1$ $f2(0) = I2 = 0$ $p1(0) = f1(0)/(f1(0)+f2(0)) = 1$ $p2(0) = f2(0)/(f1(0)+f2(0)) = 0$ (2) In the case of t=1

$f1(1) = \phi1(t1)(f1(0)\delta11 + f2(0)\delta21) = 0.8 \times (1 \times 0.8 + 0 \times 0.1) = 0.64$ $f2(1) = \phi2(t1)(f1(0)\delta12 + f2(0)\delta22) = 0.4 \times (1 \times 0.2 + 0 \times 0.9) = 0.08$ $p1(1) = 0.64/(0.64+0.08) = 0.889$ (3) In the case of t=2

$p2(1) = 0.08/(0.64+0.08) = 0.111$ $f1(2) = \phi1(t2)(f1(1)\delta11 + f2(1)\delta21) = 0.2 \times (0.64 \times 0.8 + 0.08 \times 0.1) = 0.104$ $f2(2) = \phi2(t2)(f1(1)\delta12 + f2(1)\delta22) = 0.6 \times (0.64 \times 0.2 + 0.08 \times 0.9) = 0.12$ $p1(2) = 0.104/(0.104+0.12) = 0.464$ $p2(2) = 0.12/(0.104+0.12) = 0.536$ The computation is similarly performed from t=3. FIG. 8 is an explanatory view illustrating a computation result at each time. As illustrated in FIG. 8, at a time t=5, the probability p1(5) that the wireless terminal 100 is in the state s1 (normal) becomes 0.285, and the probability p2(5) that the wireless terminal 100 is in the state s2 (waiting) becomes 0.715, thereby satisfying the relationship of p2(5)>p1(5). Accordingly, in the case that the output symbol string Xt is given in the form of Xt=(t1, t2, t2, t2, t1), the communication control means 140 controls the communication such that the wireless terminal 100 waits for the flooding at the time t=5.

Figure 9:
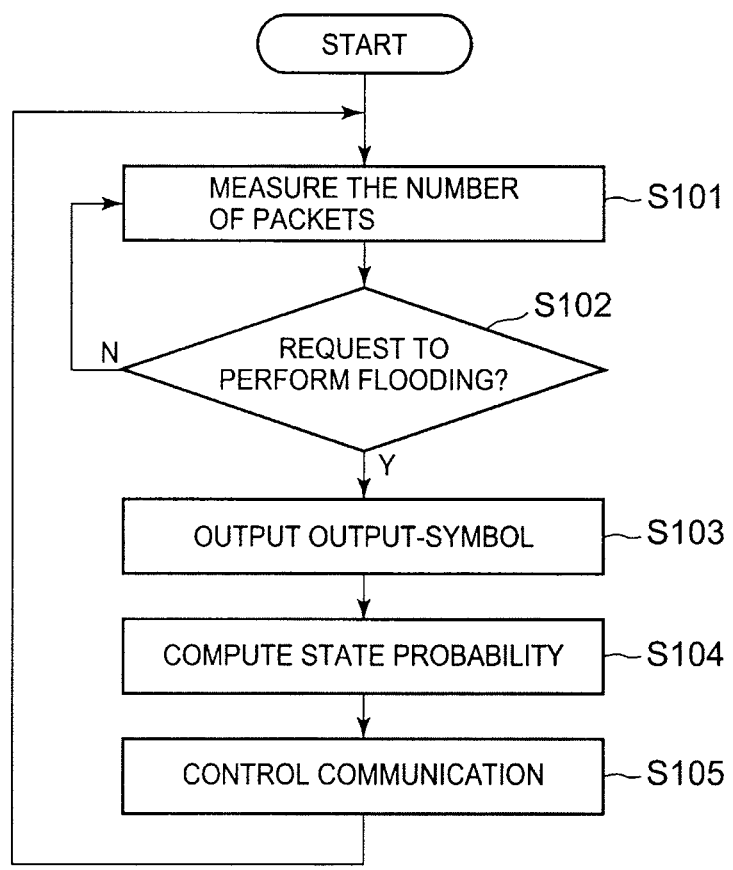
FIG. 9 is a flowchart illustrating the wireless communication forwarding control system illustrated in FIG. 1.

FIG. 9 is a flowchart illustrating the wireless communication forwarding control system illustrated in FIG. 1. Then, processing of determining whether the wireless communication forwarding control system illustrated in FIG. 1 performs the flooding will be described with reference to FIG. 9.

The packet number measuring means 110 of the wireless terminal 100 always measures the number of packets flooded from the surrounding wireless terminals at predetermined time intervals. The packet number measuring means 110 outputs the number of flooding packets since each previous time to the symbol output means 120 at each predetermined time. The symbol output means 120 stores the number of output flooding packets in the storage unit (Step S101).

When a request to perform the flooding is made at the time t (Step S102), the symbol output means 120 generates the output symbol indicating the appearance frequency of the number of flooding packets, which can be measured between the previous time and the current time at predetermined time intervals, from the surrounding wireless terminals based on the number of flooding packets measured by the packet number measuring means 110. For example, the generation of the request to perform the flooding is controlled by a communication application program implemented in the wireless terminal 100. The symbol output means 120 outputs the output symbols generated at predetermined time intervals as the output symbol string to the state probability computing means 130 (Step S103).

The output symbol string output from the symbol output means 120 is input to the state probability computing means 130, and the state probability computing means 130 computes the posterior probability pi(t) that the wireless terminal 100 is in the state si ($1 \leq i \leq 2$) (Step S104).

When the posterior probability pi(t) computed in Step S104 satisfies the relationship of p2($t$)>p1($t$), the communication control means 140 controls the communication such that the wireless terminal 100 waits for the flooding at least until the next time (t+1) (Step S105).

In the wireless communication forwarding control system of the first exemplary embodiment, whether the flooding can efficiently be performed can autonomously be determined at each wireless terminal in consideration of the status that varies from moment to moment. That is, in the wireless communication forwarding control system, the degradation of the communication efficiency and the power efficiency can be suppressed in the whole of network.

Second Exemplary Embodiment

Figure 10:
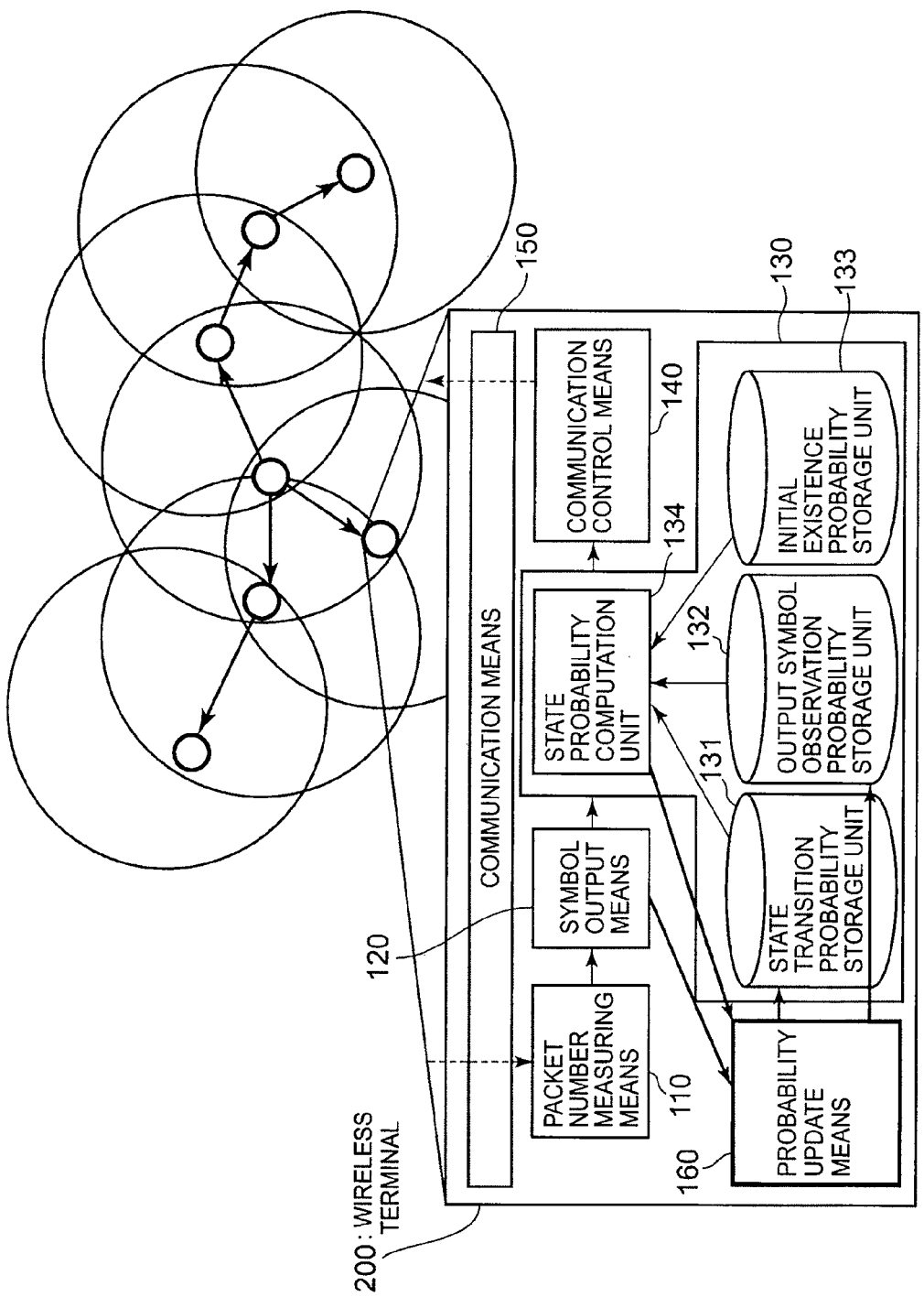
FIG. 10 is a block diagram illustrating a configuration of a wireless communication forwarding control system according to a second exemplary embodiment of the invention.

FIG. 10 is a block diagram illustrating a configuration of a wireless communication forwarding control system according to a second exemplary embodiment of the invention. The configuration of the wireless communication forwarding control system according to the second exemplary embodiment of the invention will described with reference to FIG. 10. A configuration of a wireless terminal 200 illustrated in FIG. 10 is identical to that of the wireless terminal 100 illustrated in FIG. 1 except that probability update means 160 is newly provided.

In the wireless communication forwarding control system of the first exemplary embodiment, the predetermined values of the state transition probability δ and the output symbol observation probability φ are previously given. In the wireless communication forwarding control system of the second exemplary embodiment, the state transition probability δ and the output symbol observation probability φ are updated by utilizing the computation results of the posterior probability and the like.

Probability update means 160 performs estimation (maximum likelihood estimation) of the most likely (high probability) state from the computation result performed at each time by the state probability computing means 130. The probability update means 160 stores the state of the maximum likelihood estimation and the output symbol in a storage unit (not illustrated). The probability update means 160 updates the state transition probability δ stored in the state transition probability storage unit 131 based on the result of the maximum likelihood estimation at a certain time and the result of the maximum likelihood estimation at a time previous to a certain time. The probability update means 160 updates the output symbol observation probability φ stored in the output symbol observation probability storage unit 132 based on the result of the maximum likelihood estimation at a certain time and the output symbol output at the time.

For example, it is assumed that the wireless terminal 200 is estimated to be in a state i from the result of the maximum likelihood estimation at the previous time, and it is assumed that the wireless terminal 200 is estimated to be in a state j from the result of the maximum likelihood estimation at the subsequent time. In this case, the probability update means 160 increases the value of δij indicating the probability that the wireless terminal 200 transitions from the state i to the state j. The probability update means 160 also changes other values of δ in conformity with the change of the value of δij. The changed value of δ is stored in the state transition probability storage unit 131 to update the stored state transition probability δ.

For example, it is assumed that the wireless terminal 200 is estimated to be in a state j from the result of the maximum likelihood estimation at a certain time, and it is assumed that an output symbol k is output. In this case, the probability update means 160 increases the value of φj(k) indicating the probability that the output symbol k is output in the state j. The probability update means 160 also changes other values of φ in conformity with the change of the value of φj(k). The changed value of φ is stored in the output symbol observation probability storage unit 132 to update the stored output symbol observation probability φ.

In the wireless communication forwarding control system of the second exemplary embodiment, based on the result of the maximum likelihood estimation performed from the computation result of the posterior probability and the output symbol, the state transition probability δ and the output symbol observation probability φ can be corrected to the more realistic probabilities, and whether the wireless terminal should perform the flooding can autonomously be determined with high accuracy.

In the wireless communication forwarding control system of the second exemplary embodiment, when the initial setting of each probability is set to the predetermined equal probability because the factors in previously determining the threshold n, the state transition probability δ, and the initial existence probability I do not exist, the state transition probability δ and the initial existence probability I can effectively be corrected.

The hidden Markov model is used in the wireless communication forwarding control systems of the exemplary embodiments. Alternatively, a model that can be generated on a Bayesian network and is equivalent to the hidden Markov model may be used.

In the exemplary embodiments, each means may be implemented by an individual unit.

Figure 11:
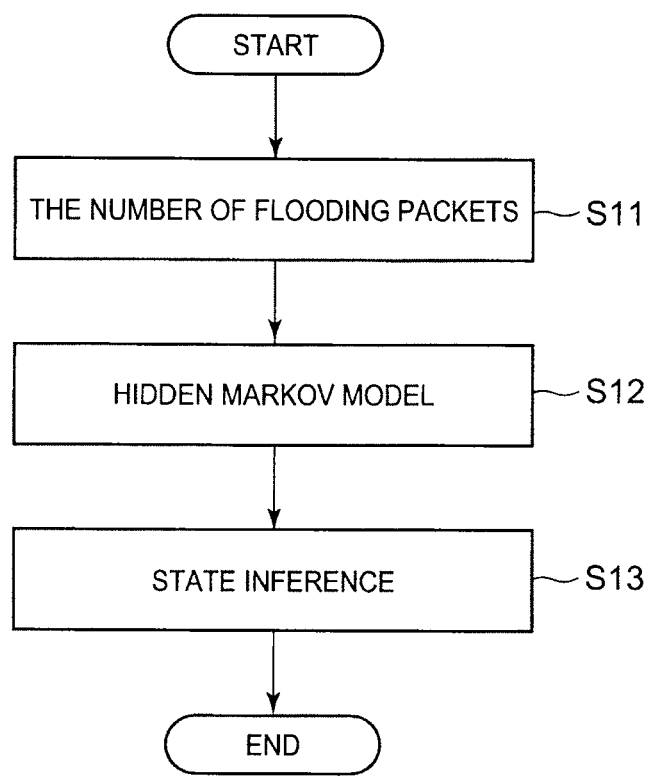
FIG. 11 is a flowchart illustrating main processing of the wireless communication terminal of the invention.
Figure 12:
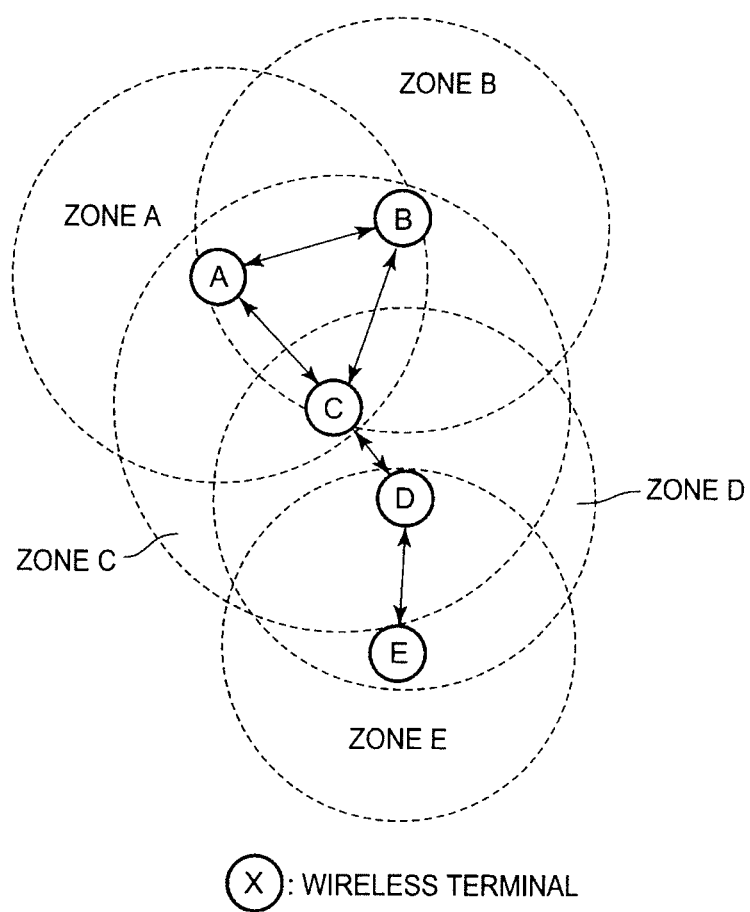
FIG. 12 is an explanatory view illustrating an example of a configuration of a wireless data communication system described in Patent Literature 1.

FIG. 11 is a flowchart illustrating main processing of the wireless communication terminal of the invention. As illustrated in Steps S11 to 13 of FIG. 11, the wireless communication terminal (for example, corresponding to the wireless terminal 100 illustrated in FIG. 1) is a wireless communication terminal that performs the flooding, and the wireless communication terminal is configured to autonomously infers whether the wireless communication terminal is in the state in which the flooding should be performed or the state in which the flooding should not be performed at each predetermined time from the number of flooding packets that is of the packet received from the surrounding wireless communication terminals by the flooding based on the hidden Markov model.

In the exemplary embodiments, the following wireless communication terminals (1) to (4) are also disclosed.

(1) The wireless communication terminal including: packet number measuring means (for example, corresponding to the packet number measuring means 110 illustrated in FIG. 1) for measuring the number of flooding packets until a current time since a previous time at each predetermined time; symbol output means (for example, corresponding to the symbol output means 120 illustrated in FIG. 1) for outputting an output symbol based on a probability distribution of the number of flooding packets measured by the packet number measuring means; state probability computing means (for example, corresponding to the state probability computing means 130 illustrated in FIG. 1) for computing a probability indicating whether the wireless communication terminal is in the state in which the flooding should be performed or the state in which the flooding should not be performed as a posterior probability with respect to a string of output symbols output from the symbol output means; and communication control means (for example, corresponding to the communication control means 140 illustrated in FIG. 1) for controlling communication such that the flooding is performed when the posterior probability computed by the state probability computing means indicates that the probability that the wireless communication terminal is in the state in which the flooding should be performed is higher than the probability that the wireless communication terminal is in the state in which the flooding should not be performed.

(2) The wireless communication terminal, wherein the symbol output means outputs different output symbols depending on whether both an upper cumulative probability and a lower cumulative probability indicate a predetermined threshold (for example, corresponding to the threshold no of the first exemplary embodiment) or more with respect to the number of packets measured by the packet number measuring means in a Poisson distribution (for example, corresponding to the Poisson distribution illustrated in FIG. 4) adhering to an average value of the number of flooding packets measured at given time intervals by the packet number measuring means (for example, implemented by the operation in which the symbol output means 120 outputs t1 or t2 in the first exemplary embodiment).

(3) The wireless communication terminal, wherein the state probability computing means includes: a state transition probability unit (for example, corresponding to the state transition probability storage unit 131 illustrated in FIG. 1) in which a conditional probability, which is of a transition probability from a last state to a current state, is stored as a state transition probability (for example, corresponding to the state transition probability δ); an output symbol observation probability storage unit (for example, corresponding to the output symbol observation probability storage unit 132 illustrated in FIG. 1) in which a conditional probability, which is of an output probability of the output symbol in each state, is stored as an output symbol observation probability (for example, corresponding to the output symbol observation probability φ); and an initial existence probability storage unit (for example, corresponding to the initial existence probability storage unit 133 illustrated in FIG. 1) in which an initial existence probability (for example, corresponding to the initial existence probability I), which is of a probability that exists in each state at a beginning of an operation of a network, and the state probability computing means computes the posterior probability using the hidden Markov model indicated by a group of five terms including a state set, an output symbol set, the state transition probability, the output symbol observation probability, and the initial existence probability when the output symbol string is input from the symbol output means (for example, implemented by the operation that the state probability computation unit 134 computes the posterior probability pi(t) in the first exemplary embodiment).

(4) The wireless communication terminal includes probability update means (for example, corresponding to the probability update means 160 illustrated in FIG. 10) for updating a state transition probability and an output symbol observation probability, wherein the probability update means performs maximum likelihood estimation of the most likely state from the posterior probability computed at each time by the state probability computing means, and updates the state transition probability and the output symbol observation probability according to a result of the maximum likelihood estimation at a current time and a result of the maximum likelihood estimation at a time previous to the current time (for example, constructed by the wireless communication terminal 200 in the wireless communication forwarding control system of the second exemplary embodiment).

A part or the whole of the exemplary embodiments may also be described in, but not limited to, the following supplementary notes.

(Supplementary note 1) A wireless communication terminal that performs flooding, wherein whether the wireless communication terminal is in a state in which the flooding should be performed or a state in which the flooding should not be performed is autonomously inferred, at each predetermined time, from the number of flooding packets that are of a packet flooded from surrounding wireless communication terminals based on a hidden Markov model.

(Supplementary note 2) The wireless communication terminal described in Supplementary note 1, including: packet number measuring means for measuring the number of flooding packets until a current time since a previous time at each predetermined time; symbol output means for outputting an output symbol based on a probability distribution of the number of flooding packets measured by the packet number measuring means; state probability computing means for computing a probability indicating whether the wireless communication terminal is in the state in which the flooding should be performed or the state in which the flooding should not be performed as a posterior probability with respect to a string of output symbols output from the symbol output means; and communication control means for controlling communication such that the flooding is performed when the posterior probability computed by the state probability computing means indicates that the probability that the wireless communication terminal is in the state in which the flooding should be performed is higher than the probability that the wireless communication terminal is in the state in which the flooding should not be performed.

(Supplementary note 3) The wireless communication terminal described in Supplementary note 2, wherein the symbol output means outputs different output symbols depending on whether both an upper cumulative probability and a lower cumulative probability indicate a predetermined threshold or more with respect to the number of packets measured by the packet number measuring means in a Poisson distribution adhering to an average value of the number of flooding packets measured at given time intervals by the packet number measuring means.

(Supplementary note 4) The wireless communication terminal described in Supplementary note 2 or 3, wherein the state probability computing means includes: a state transition probability unit in which a conditional probability, which is of a transition probability from a last state to a current state, is stored as a state transition probability; an output symbol observation probability storage unit in which a conditional probability, which is of an output probability of the output symbol in each state, is stored as an output symbol observation probability; and an initial existence probability storage unit in which an initial existence probability, which is of a probability that exists in each state at a beginning of an operation of a network, and the state probability computing means computes the posterior probability using the hidden Markov model indicated by a group of five terms including a state set, an output symbol set, the state transition probability, the output symbol observation probability, and the initial existence probability when the output symbol string is input from the symbol output means.

(Supplementary note 5) The wireless communication terminal described in Supplementary note 4, including probability update means for updating a state transition probability and an output symbol observation probability, wherein the probability update means performs maximum likelihood estimation of the most likely state from the posterior probability computed at each time by the state probability computing means, and updates the state transition probability and the output symbol observation probability according to a result of the maximum likelihood estimation at a current time and a result of the maximum likelihood estimation at a time previous to the current time.

(Supplementary note 6) The wireless communication terminal described in Supplementary note 1, including: a packet number measuring unit that measures the number of flooding packets until a current time since a previous time at each predetermined time; a symbol output unit that outputs an output symbol based on a probability distribution of the number of flooding packets measured by the packet number measuring unit; a state probability computing unit that computes a probability indicating whether the wireless communication terminal is in the state in which the flooding should be performed or the state in which the flooding should not be performed as a posterior probability with respect to a string of output symbols output from the symbol output unit; and a communication control unit that controls communication such that the flooding is performed when the posterior probability computed by the state probability computing unit indicates that the probability that the wireless communication terminal is in the state in which the flooding should be performed is higher than the probability that the wireless communication terminal is in the state in which the flooding should not be performed.

(Supplementary note 7) The wireless communication terminal described in Supplementary note 6, wherein the symbol output unit outputs different output symbols depending on whether both an upper cumulative probability and a lower cumulative probability indicate a predetermined threshold or more with respect to the number of packets measured by the packet number measuring unit in a Poisson distribution adhering to an average value of the number of flooding packets measured at given time intervals by the packet number measuring unit.

(Supplementary note 8) The wireless communication terminal described in Supplementary note 6, wherein the state probability computing unit includes: a state transition probability unit in which a conditional probability, which is of a transition probability from a last state to a current state, is stored as a state transition probability; an output symbol observation probability storage unit in which a conditional probability, which is of an output probability of the output symbol in each state, is stored as an output symbol observation probability; and an initial existence probability storage unit in which an initial existence probability, which is of a probability that exists in each state at a beginning of an operation of a network, and the state probability computing unit computes the posterior probability using the hidden Markov model indicated by a group of five terms including a state set, an output symbol set, the state transition probability, the output symbol observation probability, and the initial existence probability when the output symbol string is input from the symbol output unit.

(Supplementary note 9) The wireless communication terminal described in Supplementary note 8, wherein the wireless communication terminal includes probability update unit for updating a state transition probability and an output symbol observation probability, and the probability update unit performs maximum likelihood estimation of the most likely state from the posterior probability computed at each time by the state probability computing unit, and updates the state transition probability and the output symbol observation probability according to a result of the maximum likelihood estimation at a current time and a result of the maximum likelihood estimation at a time previous to the current time.

(Supplementary note 10) A wireless communication forwarding control system in which a plurality of wireless communication terminals each of which performs flooding conduct wireless communication, wherein whether the wireless communication terminal is in a state in which the flooding should be performed or a state in which the flooding should not be performed is autonomously inferred, at each predetermined time, from the number of flooding packets that are of a packet flooded from surrounding wireless communication terminals based on a hidden Markov model.

(Supplementary note 11) The wireless communication forwarding control system described in Supplementary note 10, wherein the wireless communication terminal includes: packet number measuring means for measuring the number of flooding packets until a current time since a previous time at each predetermined time; symbol output means for outputting an output symbol based on a probability distribution of the number of flooding packets measured by the packet number measuring means; state probability computing means for computing a probability indicating whether the wireless communication terminal is in the state in which the flooding should be performed or the state in which the flooding should not be performed as a posterior probability with respect to a string of output symbols output from the symbol output means; and communication control means for controlling communication such that the flooding is performed when the posterior probability computed by the state probability computing means indicates that the probability that the wireless communication terminal is in the state in which the flooding should be performed is higher than the probability that the wireless communication terminal is in the state in which the flooding should not be performed.

(Supplementary note 12) The wireless communication forwarding control system described in Supplementary note 11, wherein the symbol output means outputs different output symbols depending on whether both an upper cumulative probability and a lower cumulative probability indicate a predetermined threshold or more with respect to the number of packets measured by the packet number measuring means in a Poisson distribution adhering to an average value of the number of flooding packets measured at given time intervals by the packet number measuring means.

(Supplementary note 13) The wireless communication forwarding control system described in Supplementary note 11 or 12, wherein the state probability computing means includes: a state transition probability unit in which a conditional probability, which is of a transition probability from a last state to a current state, is stored as a state transition probability; an output symbol observation probability storage unit in which a conditional probability, which is of an output probability of the output symbol in each state, is stored as an output symbol observation probability; and an initial existence probability storage unit in which an initial existence probability, which is of a probability that exists in each state at a beginning of an operation of a network, and the state probability computing means computes the posterior probability using the hidden Markov model indicated by a group of five terms including a state set, an output symbol set, the state transition probability, the output symbol observation probability, and the initial existence probability when the output symbol string is input from the symbol output means.

(Supplementary note 14) The wireless communication forwarding control system described in Supplementary note 13, wherein the wireless communication terminal includes probability update means for updating a state transition probability and an output symbol observation probability, and the probability update means performs maximum likelihood estimation of the most likely state from the posterior probability computed at each time by the state probability computing means, and updates the state transition probability and the output symbol observation probability according to a result of the maximum likelihood estimation at a current time and a result of the maximum likelihood estimation at a time previous to the current time.

(Supplementary note 15) The wireless communication forwarding control system described in Supplementary note 10, including: a packet number measuring unit that measures the number of flooding packets until a current time since a previous time at each predetermined time; a symbol output unit that outputs an output symbol based on a probability distribution of the number of flooding packets measured by the packet number measuring unit; a state probability computing unit that computes a probability indicating whether the wireless communication terminal is in the state in which the flooding should be performed or the state in which the flooding should not be performed as a posterior probability with respect to a string of output symbols output from the symbol output unit; and a communication control unit that controls communication such that the flooding is performed when the posterior probability computed by the state probability computing unit indicates that the probability that the wireless communication terminal is in the state in which the flooding should be performed is higher than the probability that the wireless communication terminal is in the state in which the flooding should not be performed.

(Supplementary note 16) The wireless communication forwarding control system described in Supplementary note 15, wherein the symbol output unit outputs different output symbols depending on whether both an upper cumulative probability and a lower cumulative probability indicate a predetermined threshold or more with respect to the number of packets measured by the packet number measuring unit in a Poisson distribution adhering to an average value of the number of flooding packets measured at given time intervals by the packet number measuring unit.

(Supplementary note 17) The wireless communication forwarding control system described in Supplementary note 15, wherein the state probability computing unit includes: a state transition probability unit in which a conditional probability, which is of a transition probability from a last state to a current state, is stored as a state transition probability; an output symbol observation probability storage unit in which a conditional probability, which is of an output probability of the output symbol in each state, is stored as an output symbol observation probability; and an initial existence probability storage unit in which an initial existence probability, which is of a probability that exists in each state at a beginning of an operation of a network, and the state probability computing unit computes the posterior probability using the hidden Markov model indicated by a group of five terms including a state set, an output symbol set, the state transition probability, the output symbol observation probability, and the initial existence probability when the output symbol string is input from the symbol output unit.

(Supplementary note 18) The wireless communication forwarding control system described in Supplementary note 17, wherein the wireless communication terminal includes probability update unit for updating a state transition probability and an output symbol observation probability, and the probability update unit performs maximum likelihood estimation of the most likely state from the posterior probability computed at each time by the state probability computing unit, and updates the state transition probability and the output symbol observation probability according to a result of the maximum likelihood estimation at a current time and a result of the maximum likelihood estimation at a time previous to the current time.

(Supplementary note 19) A wireless communication forwarding control method performed by a wireless communication terminal that performs flooding, wherein the wireless communication terminal autonomously infers, at each predetermined time, whether the wireless communication terminal is in a state in which the flooding should be performed or a state in which the flooding should not be performed from the number of flooding packets that are of a packet flooded from surrounding wireless communication terminals based on a hidden Markov model.

(Supplementary note 20) The wireless communication forwarding control method described in Supplementary note 19, wherein the number of flooding packets until a current time since a previous time is measured at each predetermined time, an output symbol is output based on a probability distribution of the number of measured flooding packets, a probability indicating whether the wireless communication terminal is in the state in which the flooding should be performed or the state in which the flooding should not be performed is computed as a posterior probability with respect to a string of output symbols, and communication is controlled such that the flooding is performed when the computed posterior probability indicates that the probability that the wireless communication terminal is in the state in which the flooding should be performed is higher than the probability that the wireless communication terminal is in the state in which the flooding should not be performed.

(Supplementary note 21) The wireless communication forwarding control method described in Supplementary note 20, wherein different output symbols are output depending on whether both an upper cumulative probability and a lower cumulative probability indicate a predetermined threshold or more with respect to the number of measured packets in a Poisson distribution adhering to an average value of the number of flooding packets measured at given time intervals.

(Supplementary note 22) The wireless communication forwarding control method described in Supplementary note 20 or 21, wherein the posterior probability is computed using the hidden Markov model indicated by a group of five terms including a state set, an output symbol set, a state transition probability that is of a transition probability from a last state to a current state, an output symbol observation probability that is of an output probability of the output symbol in each state, and an initial existence probability that is of a probability that exists in each state at a beginning of an operation of a network when the output symbol string is input.

(Supplementary note 23) The wireless communication forwarding control method described in Supplementary note 22, wherein maximum likelihood estimation of the most likely state is performed from the posterior probability computed at each time, and the state transition probability and the output symbol observation probability are updated according to a result of the maximum likelihood estimation at a current time and a result of the maximum likelihood estimation at a time previous to the current time.

(Supplementary note 24) A wireless communication forwarding control program that causes a computer, which is mounted on a wireless communication terminal that performs flooding, to perform processing of autonomously inferring whether the wireless communication terminal is in a state in which the flooding should be performed or a state in which the flooding should not be performed, at each predetermined time, from the number of flooding packets that are of a packet flooded from surrounding wireless communication terminals based on a hidden Markov model.

(Supplementary note 25) The wireless communication forwarding control program described in Supplementary note 24, wherein the computer is caused to perform: processing of measuring the number of flooding packets until a current time since a previous time at each predetermined time; processing of outputting an output symbol based on a probability distribution of the number of measured flooding packets; processing of computing a probability indicating whether the wireless communication terminal is in the state in which the flooding should be performed or the state in which the flooding should not be performed as a posterior probability with respect to a string of output symbols; and processing of controlling communication such that the flooding is performed when the computed posterior probability indicates that the probability that the wireless communication terminal is in the state in which the flooding should be performed is higher than the probability that the wireless communication terminal is in the state in which the flooding should not be performed.

(Supplementary note 26) The wireless communication forwarding control program described in Supplementary note 25, wherein the computer is caused to perform processing of outputting different output symbols depending on whether both an upper cumulative probability and a lower cumulative probability indicate a predetermined threshold or more with respect to the number of measured packets in a Poisson distribution adhering to an average value of the number of flooding packets measured at given time intervals.

(Supplementary note 27) The wireless communication forwarding control program described in Supplementary note 25 or 26, wherein the computer is caused to perform processing of computing the posterior probability using the hidden Markov model indicated by a group of five terms including a state set, an output symbol set, a state transition probability that is of a transition probability from a last state to a current state, an output symbol observation probability that is of an output probability of the output symbol in each state, and an initial existence probability that is of a probability that exists in each state at a beginning of an operation of a network when the output symbol string is input.

(Supplementary note 28) The wireless communication forwarding control program described in Supplementary note 27, wherein the computer is caused to perform processing of performing maximum likelihood estimation of the most likely state from the posterior probability computed at each time, and updating the state transition probability and the output symbol observation probability according to a result of the maximum likelihood estimation at a current time and a result of the maximum likelihood estimation at a time previous to the current time.

Although the embodiments of the invention are described above, the invention is not limited to the embodiments. It is understood by those skilled in the art that various changes and modifications can be made without departing from the scope of the invention.

This application is based on Japanese Patent Application No. 2009-119934 filed with Japan Patent Office on May 18, 2009, the entire content of which is hereby incorporated by reference.

INDUSTRIAL APPLICABILITY

The wireless communication forwarding control method according to the invention can be applied to the ad-hoc communication processing performed by the battery-driven wireless terminal constituting the wireless communication system. The wireless communication forwarding control method can also be applied to the sensor network system of the wireless ad-hoc network.

DESCRIPTION OF REFERENCE SIGNS

100,200 wireless terminal
110 packet number measuring means
120 symbol output means
130 state probability computing means
131 state transition probability storage unit
132 output symbol observation probability storage unit
133 initial existence probability storage unit
134 state probability computation unit
140 communication control means
150 communication means
160 probability update means

The invention claimed is:
1. A wireless communication terminal that performs flooding, wherein the wireless communication terminal autonomously infers based on a hidden Markov model whether the wireless communication terminal is in a state in which the flooding should be performed or a state in which the flooding should not be performed, at each predetermined time, from a number of flooding packets that are received from surrounding wireless communication terminals by flooding;
the communication terminal comprises:
a packet number measuring unit which measures the number of flooding packets until a current time since a previous time at each predetermined time;

a symbol output unit which outputs an output symbol based on a probability distribution of the number of flooding packets measured by the packet number measuring unit;

a state probability computing unit which computes a probability indicating whether the wireless communication terminal is in the state in which the flooding should be performed or the state in which the flooding should not be performed as a posterior probability with respect to a string of output symbols output from the symbol output unit; and a communication control unit which controls communication such that the flooding is performed when the posterior probability computed by the state probability computing unit indicates that the probability that the wireless communication terminal is in the state in which the flooding should be performed is higher than the probability that the wireless communication terminal is in the state in which the flooding should not be performed.

2. The wireless communication terminal according to claim 1, wherein the symbol output unit outputs different output symbols depending on whether both an upper cumulative probability and a lower cumulative probability indicate a predetermined threshold or more with respect to the number of packets measured by the packet number measuring unit in a Poisson distribution adhering to an average value of the number of flooding packets measured at given time intervals by the packet number measuring unit.

3. The wireless communication terminal according to claim 1, wherein the state probability computing unit includes:

a state transition probability unit in which a conditional probability, which is of a transition probability from a last state to a current state, is stored as a state transition probability;

an output symbol observation probability storage unit in which a conditional probability, which is of an output probability of the output symbol in each state, is stored as an output symbol observation probability; and an initial existence probability storage unit in which an initial existence probability, which is of a probability that exists in each state at a beginning of an operation of a network, and the state probability computing unit computes the posterior probability using the hidden Markov model indicated by a group of five terms including a state set, an output symbol set, the state transition probability, the output symbol observation probability, and the initial existence probability when the output symbol string is input from the symbol output unit.

4. The wireless communication terminal according to claim 3, further comprising a probability update unit which updates a state transition probability and an output symbol observation probability, wherein the probability update unit performs maximum likelihood estimation of the most likely state from the posterior probability computed at each time by the state probability computing unit, and updates the state transition probability and the output symbol observation probability according to a result of the maximum likelihood estimation at a current time and a result of the maximum likelihood estimation at a time previous to the current time.

5. A wireless communication forwarding control system in which a plurality of wireless communication terminals each of which performs flooding conduct wireless communication, wherein each wireless communication terminal autonomously infers based on a hidden Markov model whether the wireless communication terminal is in a state in which the flooding should be performed or a state in which the flooding should not be performed, at each predetermined time, from a number of flooding packets that are received from surrounding wireless communication terminals by flooding;

the wireless communication forwarding control system includes:

a packet number measuring unit which measures the number of flooding packets until a current time since a previous time at each predetermined time;

a symbol output unit which outputs an output symbol based on a probability distribution of the number of flooding packets measured by the packet number measuring unit;

a state probability computing unit which computes a probability indicating whether the wireless communication terminal is in the state in which the flooding should be performed or the state in which the flooding should not be performed as a posterior probability with respect to a string of output symbols output from the symbol output unit; and a communication control unit which controls communication such that the flooding is performed when the posterior probability computed by the state probability computing unit indicates that the probability that the wireless communication terminal is in the state in which the flooding should be performed is higher than the probability that the wireless communication terminal is in the state which the flooding should not be performed.

6. The wireless communication forwarding control system according to claim 5, wherein the symbol output unit outputs different output symbols depending on whether both an upper cumulative probability and a lower cumulative probability indicate a predetermined threshold or more with respect to the number of packets measured by the packet number measuring unit in a Poisson distribution adhering to an average value of the number of flooding packets measured at given time intervals by the packet number measuring unit.

7. The wireless communication forwarding control system according to claim 5, wherein the state probability computing unit includes:

a state transition probability unit in which a conditional probability, which is of a transition probability from a last state to a current state, is stored as a state transition probability;

an output symbol observation probability storage unit in which a conditional probability, which is of an output probability of the output symbol in each state, is stored as an output symbol observation probability; and an initial existence probability storage unit in which an initial existence probability, which is of a probability that exists in each state at a beginning of an operation of a network, and the state probability computing unit computes the posterior probability using the hidden Markov model indicated by a group of five terms including a state set, an output symbol set, the state transition probability, the output symbol observation probability, and the initial existence probability when the output symbol string is input from the symbol output unit.

8. The wireless communication forwarding control system according to claim 7, wherein the wireless communication terminal includes a probability update unit which updates a state transition probability and an output symbol observation probability, and wherein the probability update unit performs maximum likelihood estimation of the most likely state from the posterior probability computed at each time by the state probability computing unit, and updates the state transition probability and the output symbol observation probability according to a result of the maximum likelihood estimation at a current time and a result of the maximum likelihood estimation at a time previous to the current time.

9. A wireless communication forwarding control method performed by a wireless communication terminal that performs flooding, comprising:

inferring autonomously based on a hidden Markov model, at each predetermined time, whether the wireless communication terminal is in a state in which the flooding should be performed or a state in which the flooding should not be performed from a number of flooding packets that are received from surrounding wireless communication terminals by flooding;

the method further comprises:

measuring, at each predetermined time, the number of flooding packets until a current time since a previous time, outputting an output symbol based on a probability distribution of the number of measured flooding packets, computing a probability indicating whether the wireless communication terminal is in the state in which the flooding should be performed or the state in which the flooding should be performed or the state in which the flooding should not be performed, as a posterior probability with respect to a string of output symbols, and controlling communication such that the flooding is performed when the computed posterior probability indicates that the probability that the wireless communication terminal is in the state in which the flooding should be performed is higher than the probability that the wireless communication terminal is in the state in which the flooding should not be performed.

10. The wireless communication forwarding control method according to claim 9, further comprising:

outputting different output symbols depending on whether both an upper cumulative probability and a lower cumulative probability indicate a predetermined threshold or more with respect to the number of measured packets in a Poisson distribution adhering to an average value of the number of flooding packets measured at given time intervals.

11. The wireless communication forwarding control method according to claim 9, further comprising:

computing the posterior probability by using the hidden Markov model indicated by a group of five terms including a state set, an output symbol set, a state transition probability that is of a transition probability from a last state to a current state, an output symbol observation probability that is of an output probability of the output symbol in each state, and an initial existence probability that is of a probability that exists in each state at a beginning of an operation of a network when the output symbol string is input.

12. The wireless communication forwarding control method according to claim 11, further comprising:

estimating most likely state from the posterior probability computed at each time, and updating the state transition probability and the output symbol observation probability according to a result of the maximum likelihood estimation at a current time and a result of the maximum likelihood estimation at a time previous to the current time.

13. A non-transitory computer readable information recording medium storing a wireless communication forwarding control program when executed by a processor mounted on a wireless communication terminal, performs a method comprising:

autonomously inferring based on a hidden Markov model whether the wireless communication terminal is in a state in which flooding should be performed or a state in which the flooding should not be performed, at each predetermined time, from a number of flooding packets that are received from surrounding wireless communication terminals by flooding;

the method further comprising:

measuring the number of flooding packets until a current time since a previous time at each predetermined time;

outputting an output symbol based on a probability distribution of the number of measured flooding packets;

computing a probability indicating whether the wireless communication terminal is in the state in which the flooding should be performed or the state in which the flooding should not be performed as a posterior probability with respect to a string of output symbols; and controlling communication such that the flooding is performed when the computed posterior probability indicates that the probability that the wireless communication terminal is in the state in which the flooding should be performed is higher than the probability that the wireless communication terminal is in the state in which the flooding should not be performed.

14. The non-transitory computer readable information recording medium according to claim 13, further comprising:

outputting different output symbols depending on whether both an upper cumulative probability and a lower cumulative probability indicate a predetermined threshold or more with respect to the number of measured packets in a Poisson distribution adhering to an average value of the number of flooding packets measured at given time intervals.

15. The non-transitory computer readable information recording medium according to claim 13, further comprising:

computing the posterior probability using the hidden Markov model indicated by a group of five terms including a state set, an output symbol set, a state transition probability that is of a transition probability from a last state to a current state, an output symbol observation probability that is of an output probability of the output symbol in each state, and an initial existence probability that is of a probability that exists in each state at a beginning of an operation of a network when the output symbol string is input.

16. The non-transitory computer readable information recording medium according to claim 15, further comprising:

performing maximum likelihood estimation of the most likely state from the posterior probability computed at each time, and updating the state transition probability and the output symbol observation probability according to a result of the maximum likelihood estimation at a current time and a result of the maximum likelihood estimation at a time previous to the current time.

* * * * *

UNITED STATES PATENT AND TRADEMARK OFFICE
CERTIFICATE OF CORRECTION

| | |
|---|---|
| PATENT NO. | : 8,730,875 B2 |
| APPLICATION NO. | : 13/321030 |
| DATED | : May 20, 2014 |
| INVENTOR(S) | : Jun Noda |

Page 1 of 1

It is certified that error appears in the above-identified patent and that said Letters Patent is hereby corrected as shown below:

In the Specification

Column 9, Line 49: Delete "no" and insert -- n% --.

In the Claims

Column 19, Line 24: In Claim 9, after "is in" delete "the state in which the flooding should be performed or".

Signed and Sealed this
Ninth Day of December, 2014

Michelle K. Lee
*Deputy Director of the United States Patent and Trademark Office*